United States Patent [19]

Manderson

[11] Patent Number: 4,917,589

[45] Date of Patent: Apr. 17, 1990

[54] SOAP BAR FORMING APPARATUS

[76] Inventor: David A. Manderson, 6300 Fransean Dr., Hodgkins, Ill. 60525

[21] Appl. No.: 177,455

[22] Filed: Apr. 4, 1988

[51] Int. Cl.[4] .................... B29C 43/36

[52] U.S. Cl. .................... 425/318; 264/DIG. 69; 425/422; 425/DIG. 46

[58] Field of Search .................... 425/318, 406, 410, 416, 425/422, 469, DIG. 46; 264/115, 120, DIG. 69

[56] References Cited

U.S. PATENT DOCUMENTS

| | | | |
|---|---|---|---|
| 1,782,076 | 11/1930 | Safford, Sr. | 425/318 |
| 2,271,959 | 2/1942 | Swanson | 252/134 |
| 2,380,892 | 7/1945 | White | 425/318 |
| 2,486,347 | 10/1949 | Walker | 425/318 |
| 2,621,368 | 12/1952 | Marshall | 264/115 |
| 3,148,430 | 9/1964 | Hanner | 425/318 X |
| 3,746,647 | 7/1973 | Peloquin | 252/91 |
| 3,931,035 | 1/1976 | Brown | 252/134 |
| 4,035,122 | 7/1977 | Cavanaugh | 425/410 X |
| 4,501,355 | 2/1985 | Hoffman | 425/318 X |
| 4,753,758 | 6/1988 | Miller | 261/DIG. 65 |
| 4,781,564 | 11/1988 | Cerrone | 264/DIG. 69 |

OTHER PUBLICATIONS

Miles Kimball Company catalog, p. 25, item entitled "Soap Saver Mold" (date unknown).

*Primary Examiner*—Richard L. Chiesa
*Attorney, Agent, or Firm*—Emrich & Dithmar

[57] ABSTRACT

A soap bar forming apparatus includes a generally hollow housing having an aperture extending therethrough and a removable base. After soaking a plurality of soap particles, or chips, each of which is the residue of a substantially used soap bar, in water to allow the soap particles to become soft and pliable, the soap particles are placed in the housing with its base attached thereto. A plunger, or compressing element, is then inserted into the housing's aperture and manually displaced therein so as to compress the soap particles which adhere to one another in forming a composite bar of soap with a shape defined by the housing, its base, and the plunger. The base is then removed from the housing to permit the composite soap bar to be removed from the housing by continued displacement of the plunger. The base and housing may be coupled by threaded engagement, a flange and slot arrangement, or by virtually any conventional means. Similarly, the interior of the housing as well as the facing portions of the base and the plunger may be configured to provide a wide variety of soap bar shapes and sizes.

3 Claims, 1 Drawing Sheet

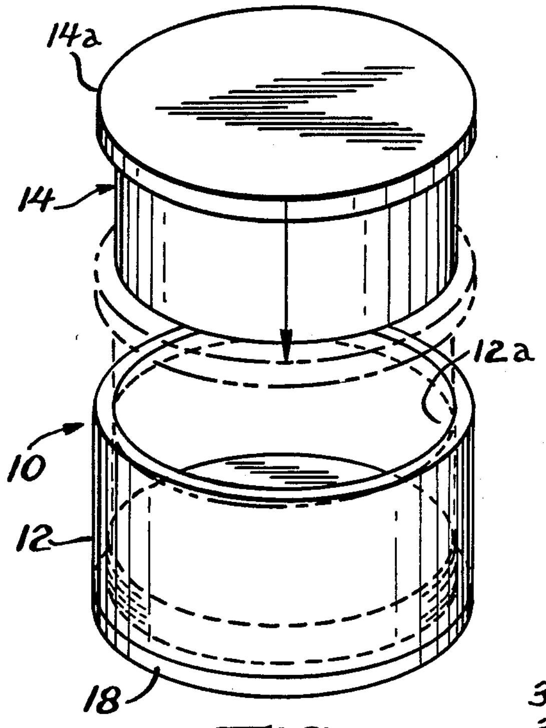
FIG. 1
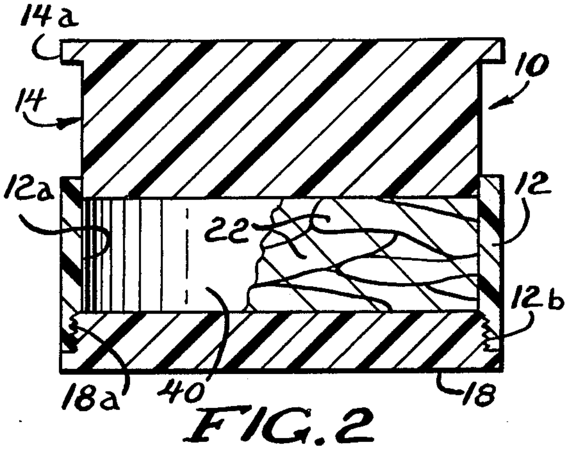
FIG. 2
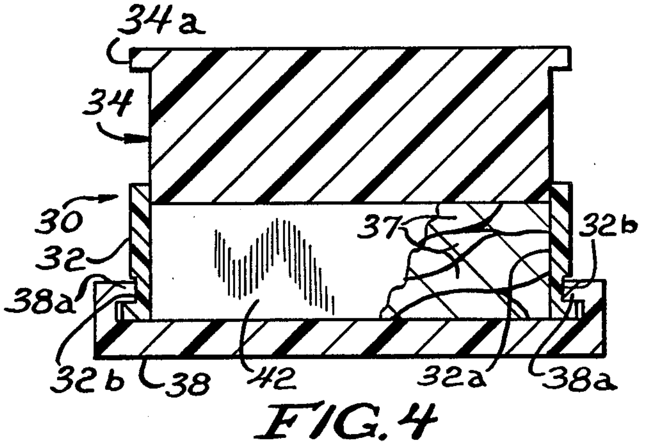
FIG. 4
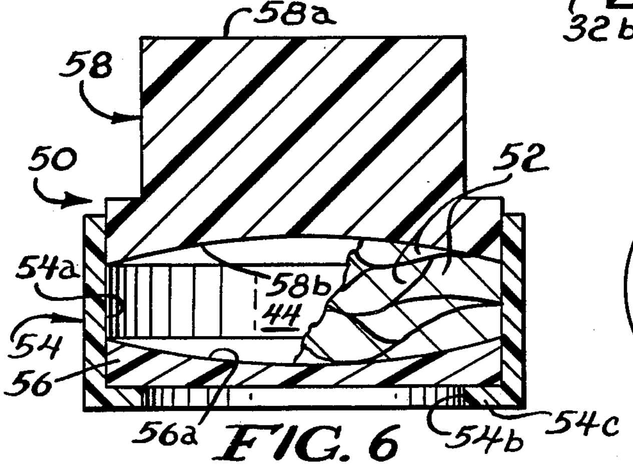
FIG. 6
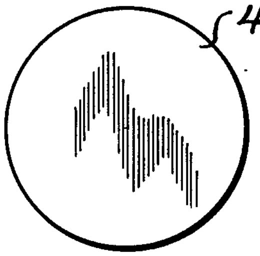
FIG. 3
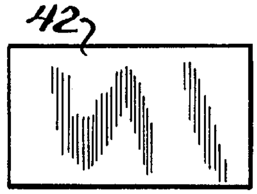
FIG. 5
FIG. 7
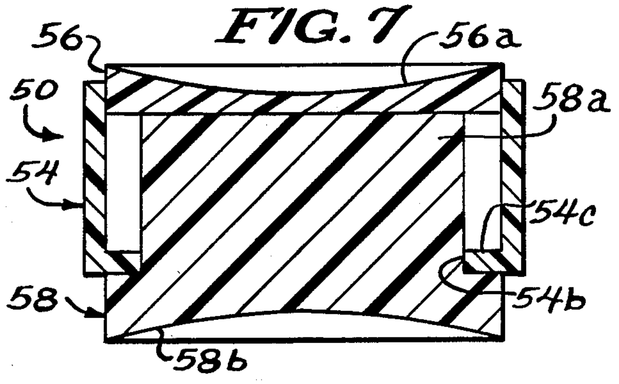
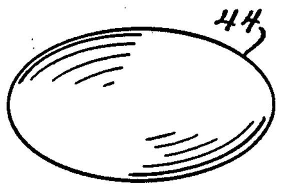
FIG. 8

SOAP BAR FORMING APPARATUS

BACKGROUND OF THE INVENTION

This invention relates generally to the formation of a bar of soap and is particularly directed to apparatus for forming a composite soap bar out of scraps of substantially used soap bars.

Bars of hand soap have been fabricated by various methods in the past. For example, U.S. Pat. No. 2,621,368 to Marshall discloses an arrangement for the progressive compacting in a stepwise manner of granules of powdered soap into a monolithic durable mass in the form of a bar. The soap powder is repeatedly compacted between a pair of forming dies in a two step manner involving initially sealing the shell or surface of the compact to entrap air cells in the soap bar, followed by repeatedly striking the compacted powder mass and releasing the pressure thereon between strikes with the compacting pressure of successive strokes progressively increasing in graduated increments.

Conventional soap molds used for forming soap bars from chips or fragments in the manufacture of soap bars apply forces in excess of 300 psi during soap bar formation. U.S. Pat. No. 3,746,647 to Peloquin discusses the use of such commercial soap molding apparatus for forming decoratively patterned soap bars comprised of discrete soap fragments consolidated into an integral mass. Adjacent fragments in the soap bar made in accordance with the teachings of Peloquin are separated by a zone or layer of visually exposed water-insoluble pigment particles arranged to separate the interfaced borders of the fragments throughout the useful life of the fragments.

During ordinary use, a soap bar is worn down to a thin and relatively fragile body which is easily broken, difficult to hold, and usually discarded. This procedure is, of course, wasteful since the soap fragment retains the cleansing capability of the original, unused soap bar. On a large scale, such as in the use of soap by a large institution, such wasteful soap usage results in considerable monetary loss. U.S. Pat. No. 3,931,035 to Brown seeks to reduce this loss by disclosing a soap bar having a hollow shell of bar soap material defining a cavity filled by a core composed of small remaining pieces of soap bars and a congealed mass of a soap solution. The hollow shell has an access opening through which the soap pieces and solution, in a fluent form, are applied to the cavity. U.S. Pat. No. 2,271,959 also seeks to reduce bar soap waste by disclosing a soap bar having a hollow or concave cavity which is adapted to receive a rounded side of a used soap bar. The concave cavity is provided with a series of spaced upstanding projections, or teeth, molded into the soap bar which engage a partially used soap bar positioned in intimate contact with the cavity so as to form a new composite bar comprised partially of the previously used soap bar. The '035 patent requires a special solution for mixing with the soap bar remnants in the hollow shell, while the '959 patent requires the new soap bar to have a rather complicated surface configuration which increases its cost, making it less commercially attractive. Other approaches have made use of a housing open at both ends where a pair of threaded end caps may be attached so as to enclose and compress soap particles within the housing. This approach suffers from difficulties in removing the collection of compressed soap particles from the housing as well as the requirement that the housing must be completely filled with the soap particles before a new bar of soap is formed.

The present invention is intended to overcome the aforementioned limitations of the prior art by providing an inexpensive, easily operated, consumer oriented apparatus for compacting a plurality of soap bar remnants into a full size, composite soap bar. The apparatus of the present invention thus substantially increases the useful life of a soap bar and essentially eliminates heretofore encountered soap bar waste.

OBJECTS AND SUMMARY OF THE INVENTION

Accordingly it is an object of the present invention to provide for the recycling of used soap bars.

It is another object of the present invention to provide for the compaction of used soap bar scraps into a reusable bar of virtually any shape or size.

Yet another object of the present invention is to provide an inexpensive, efficient, easily operated, and effective means for converting a collection of small soap bar scraps into a reusable, full size bar of soap.

A further object of the present invention is to provide means for recycling a plurality of small soap bar scraps into a reusable full size bar of soap which is particularly adapted for consumer use.

This invention contemplates apparatus for forming a plurality of pliable soap particles formed from substantially used soap bars into a new soap bar, the apparatus comprising a housing having an aperture with first and second open ends which extends through the housing; a removable base coupled to the housing over the first open end of the aperture, wherein the base is adapted to receive and support soap particles deposited into the aperture via the second open end thereof; and manually operated compressing means adapted for insertion into the second open end of the aperture and compression of the soap particles into a new soap bar when displaced toward the base, whereupon the new soap bar may be removed from the housing with further displacement of the compressing means following removal of the base from the housing.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is an upper perspective view of one embodiment of a soap bar forming apparatus in accordance with the present invention illustrating the plunger element thereof removed from and inserted into the housing portion of the apparatus;

FIG. 2 is a vertical sectional view of the soap bar forming apparatus of FIG. 1;

FIG. 3 is a top planar view of a bar of soap formed by the soap bar forming apparatus of FIGS. 1 and 2;

FIG. 4 is a vertical sectional view of another embodiment of a soap bar forming apparatus in accordance with the present invention;

FIG. 5 is a top planar view of a soap bar formed with the soap bar forming apparatus of FIG. 4;

FIG. 6 is a vertical sectional view of yet another embodiment of a soap bar forming apparatus in accordance with the present invention;

FIG. 7 is a vertical sectional view of the soap bar forming apparatus of FIG. 6 illustrating the manner in which the composite soap bar formed by this apparatus is removed therefrom for use; and FIG. 8 is a top planar view of a soap bar formed by the soap bar forming apparatus illustrated in FIGS. 6 and 7.

DETAILED DESCRIPTION OF THE PREFERRED EMBODIMENTS

Referring to FIG. 1, there is shown an upper perspective view of a soap bar forming apparatus 10 in accordance with the present invention. Soap bar forming apparatus 10 includes a generally cylindrical housing 12 having an aperture, or bore, **12*a* extending therethrough from top to bottom. While the bore 12*a* is shown as cylindrical in shape, it may assume virtually any cross sectional shape, e.g., elliptical, rectangular, square, etc. Disposed on the lower end of the housing 12 is a removable disc-shaped base 18. The bore 12*a* in the housing 12 is adapted to receive in tight fitting, sliding engagement a generally cylindrical plunger, or compressing element, 14. The upper end of the compressing element 14 is provided with an enlarged gripping portion 14*a* which facilitates manual grasping of the compressing element and also limits the extent of insertion of the compressing element into the housing 12. As shown by the arrow in FIG. 1, the compressing element 14 is adapted for downward insertion into the bore 12*a* of the housing 12**.

Referring to FIG. 2, there is shown a vertical sectional view of the soap bar forming apparatus 10 of FIG. 1. As shown in FIG. 2, the base 18 is provided with outer threads **18*a*, while the inner, lower portion of the housing 12 is provided with a complementary threaded arrangement 12*b*. The threads 18*a* of the base 18 are adapted for engagement with the threads 12*b* of the housing 12 to permit the base to be either securely attached to or entirely removed from the housing. The present invention also contemplates a reversal of this thread arrangement, i.e., threads on an inner portion of the base 18 as well as on an outer, lower portion of the housing 12. With the base 18 attached to the lower portion of the housing 12, its bore 12*a* is adapted to receive a plurality of soap particles, or chips, 22. These soap particles 22 are the remnants of substantially used bars of hand soap. The soap particles 22 are deposited within the housing 12 and are supported by the base 18. With the soap particles 22 thus positioned within the housing 12, the compressing element 14 is then inserted in the housing's bore 12*a* and displaced downward toward the base 18 so as to compress the soap particles 22 together, whereupon the soap particles form a unitary, composite structure due to the mutual adherence of the individual soap particles. After the compressing element 14 has been fully displaced toward the base 18 and the collection of soap particles 22 is not capable of further compression, the base 18 is removed from the housing 12. With the base 18 removed from the housing 12, further downward displacement of the compressing element 14 causes its lower end to extend beyond the lower end of the bore 12*a*, resulting in discharge of a composite soap bar 40 from the housing. The soap bar 40 may then be used as a conventional new bar of soap. Where the soap bar 40 adheres to the lower surface of the compressing element 14 after discharge from the housing 12, the removed base 18 may be used to scrape the soap bar from the compressing element in separating it from the soap bar forming apparatus 10. The new soap bar may also be removed from the compressing element 14 by scraping the compressing element across a lip of the housing 12 so that the housing engages the bar of soap and separates it from the compressing element. A sharp object, such as a knife, may also be used to separate the bar of soap from the compressing element. Referring to FIG. 3, there is shown a top plan view of soap bar 40, which has a generally disc-like shape due to the cylindrical configuration of the housing 12 and the generally flat facing surfaces of the compressing element 14 and base 18**.

Prior to compression of the soap particles 22, it is desirable to soak the soap particles in water for approximately two hours. This renders the individual soap particles 22 in a pliable, adherent condition which facilitates their subsequent compression and the formation of a single, composite soap bar comprised of the plurality of soap bar remnants. Soaking of the soap particles 22 may be performed within the housing 12 by filling the housing with water after the soap particles are deposited therein. After the soap particles 22 have been soaked for a time sufficient to render them pliable and sticky, the water may then be poured out of the housing 12, with the soap particles then compressed to form a single composite bar of soap as previously described. In another approach, the soap particles 22 may be soaked in another container and then deposited in the housing 12 when in suitable condition for compression and mutual adherence.

Referring to FIG. 4, there is shown a vertical sectional view of another embodiment of a soap bar forming apparatus 30 in accordance with the present invention. Soap bar forming apparatus 30 also includes a housing 32, but in the embodiment of FIG. 4, the housing is generally square, or rectangular, and thus includes a plurality of adjoining, generally planar walls defining an aperture **32*a* within and extending through the housing 32. The soap bar forming apparatus 30 includes a generally square, or rectangular, compressing element, or plunger, 34 which is adapted to be positioned within and inserted through the aperture 32*a* of the housing 32. The aperture 32*a* and plunger 34 have matching cross-sectional shapes and may assume virtually any shape in accordance with the desired configuration of the bar of soap as described above. An upper portion of the compressing element 34 is provided with an enlarged gripping portion 34*a* which facilitates its manual grasping by a user and limits the extent of insertion of the compressing element within and through the aperture 32*a*** of the housing.

The soap bar forming apparatus 30 further includes a generally rectangular base 38 adapted for secure positioning in a sliding manner on a lower portion of the housing 32. The outer, lower portions of a pair of facing walls defining a portion of the housing 32 are each provided with a respective slot **32*b* along the length thereof. Similarly, facing lateral portions of the base 38 are each provided with a flange, or shoulder, 38*a*. Each of the flanges 38*a* is adapted for sliding insertion in a respective one of the slots 32*b* in a facing, lateral wall of the housing 32. It is in this manner that the base 38 may be securely attached to and removed from the housing 32**.

With the base 38 coupled to and securely in position on a lower portion of the housing 32, a plurality of soap particles 37 are deposited in the housing, allowed to soak in water so as to become pliable and sticky, and are then compressed into a single composite bar of soap 42 by means of the compressing element 34. With the soap particles 37 thus compressed to form a single composite bar of soap 42, the base 38 is then slid off of the lower portion of the housing 32 allowing the composite soap bar 42 to be ejected from the housing by further downward displacement of the compressing element 34. Referring to FIG. 5, there is shown a top planar view of a generally rectangular shaped soap bar 42 formed by the soap bar forming apparatus 30 illustrated in FIG. 4.

Referring to FIG. 6, there is shown yet another embodiment of a soap bar forming apparatus 50 in accordance with the present invention. The soap bar forming apparatus 50 also includes a housing 54 having an aperture **54*a* extending therethrough. The aperture 54*a* is provided with a generally oval shape. Disposed about the inner, lower portion of the housing 54 is a flange 54*c* having an opening 54*b* therein which defines the lower end portion of the aperture 54*a*** in the housing.

The aperture **54*a* within the housing 54 is adapted to receive an insert 56. Once positioned within the aperture 54*a* of the housing 54, the insert 56 is maintained in position and supported by the flange 54*c* disposed about the lower portion of the housing. The lower surface of the insert is generally flat, while its upper surface is generally concave, although this surface may also be flat depending upon the shape of the soap bar to be formed. The aperture 54*a* of the housing 54 is further adapted to receive a plunger, or compressing element, 58 in tight fitting relation. The lower surface of the plunger 58 is also generally concave, while its upper portion includes a handle 58*a*. The handle 58*a* facilitates manual engagement of the plunger 58 which can be displaced within the housing 54 along the aperture 54*a* therein in a sliding manner. With a plurality of soap particles, or chips, 52 disposed within the aperture 54*a* of the housing and supported by the insert 56, the plunger 58 is then inserted into the aperture and displaced downwardly by hand. With each of the soap particles 52 rendered in a soft, pliable, adhesive state by extended soaking in water, downward displacement of the plunger 58 toward the insert 56 causes the self-adhering soap particles to be compressed into a single, composite bar of soap 44. A top plan view of a generally oval-shaped soap bar 44 formed with the soap bar forming apparatus 50 of FIG. 6 is illustrated in FIG. 8**.

With the soap particles 52 thus compressed to form a single composite soap bar 44 as described in the preceding paragraph, the plunger 58 is then removed from the aperture **54*a* within the housing 54. The handle portion 58*a* of the plunger 58 is then inserted in the lower opening 54*b* defined by the flange 54*c* in the bottom of the housing 54. Upward displacement of the plunger 58 by hand causes the upper edge of its handle 58*a* to engage the lower surface of the insert 56. Continued upward displacement of the handle 58 through the opening 54*b* as well as through the aperture 54*a* in the housing 54 causes a further upward displacement of the insert 56 and the soap bar disposed thereon. With the insert 56 thus displaced to the upper edge portion of the housing 54 as shown in FIG. 7, the formed composite soap bar (which is not shown in FIG. 7 for simplicity) may be removed from the insert. The plunger 58 is then removed from the lower portion of the housing 54 allowing the insert 56 to be positioned upon and supported by the flange 54*c*, whereupon the soap bar forming apparatus 50 is ready to receive another batch of soap particles for forming a single, composite, full size soap bar. The upper and lower surfaces of the thus formed composite soap bar may be provided with virtually any shape by appropriately configuring the upper surface 56*a* of the insert 56 and the lower surface 58*b* of the plunger 58. The thus formed composite soap bar may be removed from the plunger 58 and the insert 56, if necessary, as previously described. Alternatively, in the arrangement of FIGS. 6 and 7, the combination of the plunger 58, the insert 56, and soap bar 44 may be manually displaced upward in the housing 54** to permit the soap bar to be removed from the housing and separated from the plunger and insert.

There has thus been shown a soap bar forming apparatus having a generally hollow housing with an aperture extending therethrough and a removable base. A plurality of pliable, adhesive soap particles placed within the aperture in the housing may be compressed into a single composite bar of soap by a manually operated plunger inserted in the housing's aperture and displaced downward toward its base. The thus formed composite soap bar may then be ejected from the housing by removal of the base and further downward displacement of the plunger or reversed insertion of the plunger where the housing is provided with a removable insert. The housing, base and plunger, as well as any insert positioned within the housing, may all be comprised of any of the more common materials such as plastic, ceramic, wood, including particularly teakwood, or metal.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for forming a plurality of pliable soap particles into a soap bar, said apparatus comprising:

a housing having a generally rectangular aperture with first and second open ends and extending through said housing;

a removable base coupled to said housing over the first open end of said aperture, wherein said base is generally flat and rectangular in shape and is positioned to receive and support soap particles deposited into the aperture via the second open end thereof;

coupling means for removably connecting said base and said housing in a linear sliding manner, said coupling means including a pair of elongated, linear slots on facing, outer portions of said housing and a pair of elongated, linear flanges on facing portions of said base, with each of said slots positioned to receive a respective one of said flanges in linear sliding engagement; and manually operated, generally rectangular compressing means comprised of a unitary body and positioned for sliding insertion into the second open end of the aperture and compression of the soap particles into a generally rectangular soap bar when linearly displaced toward said base, whereupon the soap bar may be removed from said housing by further displacement of said compressing means following removal of said base from said housing.

2. The apparatus of claim 1 wherein said compressing means comprises a plunger having a gripping portion on an upper end thereof.

3. The apparatus of claim 1 comprised of material from the group plastic, ceramic, wood or metal.

* * * * *